United States Patent

Daems et al.

[19]

[11] Patent Number: 5,479,553
[45] Date of Patent: Dec. 26, 1995

[54] FIBER OPTIC SPLICE CLOSURE

[75] Inventors: Daniel F. Daems, Gravenwezel, Belgium; John R. Holman, Atlanta, Ga.; Carney P. Claunch, II, Cary, N.C.; Edward J. Wilcox, McDonald, Pa.

[73] Assignee: Raychem Corporation, Menlo Park, Calif.

[21] Appl. No.: 49,202

[22] Filed: Apr. 19, 1993

[51] Int. Cl.[6] ............................................. G02B 6/36
[52] U.S. Cl. ............................................................ 385/135
[58] Field of Search .................................... 385/135, 134

[56] References Cited

U.S. PATENT DOCUMENTS

| | | | |
|---|---|---|---|
| 4,359,262 | 11/1982 | Dolan | 385/135 |
| 4,428,645 | 1/1984 | Korbelak et al. | 350/96.20 |
| 4,679,896 | 7/1987 | Krafcik et al. | 350/96.20 |
| 4,687,289 | 8/1987 | DeSanti | 385/135 |
| 4,702,551 | 10/1987 | Coulombe | 385/135 |
| 4,805,979 | 2/1989 | Bossard et al. | 350/96.20 |
| 4,812,004 | 3/1989 | Biederstedt et al. | 385/135 |
| 4,820,007 | 4/1989 | Ross et al. | 385/135 |
| 4,911,521 | 3/1990 | Ryuto et al. | 385/135 |
| 4,927,227 | 5/1990 | Bensel, III et al. | 385/135 |
| 5,071,220 | 12/1991 | Ruello et al. | 385/135 |
| 5,097,529 | 3/1992 | Cobb et al. | 385/135 |
| 5,133,039 | 7/1992 | Dixit | 385/135 |
| 5,185,843 | 2/1993 | Aberson et al. | 385/134 |
| 5,187,766 | 2/1993 | Finzel et al. | 385/135 |
| 5,247,603 | 9/1993 | Vidacovich et al. | 385/135 |
| 5,249,253 | 9/1993 | Franckx et al. | 385/135 |

FOREIGN PATENT DOCUMENTS

| | | | |
|---|---|---|---|
| 0322168 | 6/1989 | European Pat. Off. | B29C 61/06 |
| 0333316 | 9/1989 | European Pat. Off. | G02B 6/44 |
| 0373735 | 6/1990 | European Pat. Off. | G02B 6/36 |
| 0159857 | 7/1990 | European Pat. Off. | G02B 6/44 |
| 0490644 | 6/1992 | European Pat. Off. | G02B 6/44 |
| 4119829 | 7/1992 | Germany | G02B 6/36 |
| 61-52606A | 3/1986 | Japan | 385/135 |
| 2113865 | 8/1983 | United Kingdom | G02B 7/26 |
| 2150313 | 6/1985 | United Kingdom | G02B 6/36 |

OTHER PUBLICATIONS

Raychem Corporation Telecommunications Division, FOSC 100 Fiber–Optic Splice Closure, Aug., 1986.
Siecor Corporation, The Fiber Optic Catalog, 1987–1989 (no month available).

*Primary Examiner*—Frank Gonzalez
*Attorney, Agent, or Firm*—Herbert G. Burkard; William D. Zahrt, II; A. Stephen Zavell

[57] ABSTRACT

A splice closure including a frame having a partition wall to define front and rear access areas for the closure. The frame carries one or more splice trays on a first surface portion making the splices accessible from the front or first access area. A slack storage compartment is provided on the second surface portion. The slack storage compartment includes one or more pairs of opposing sidewalls that define an access opening for the slack that is accessible from the rear access area. An extension member for the frame is disclosed for obtaining greater amounts of slack from the cable, such as for a taut sheath cable splice. A tandem longitudinal arrangement of splice trays is also disclosed and may be used for a taut sheath ring splice or for repairing a severed cable.

52 Claims, 5 Drawing Sheets

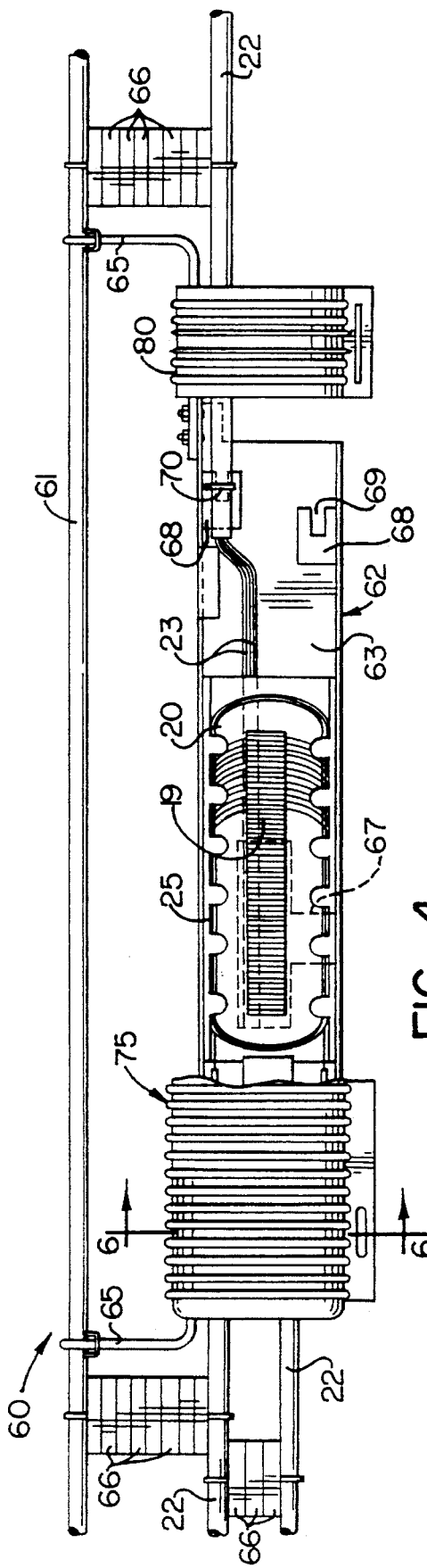
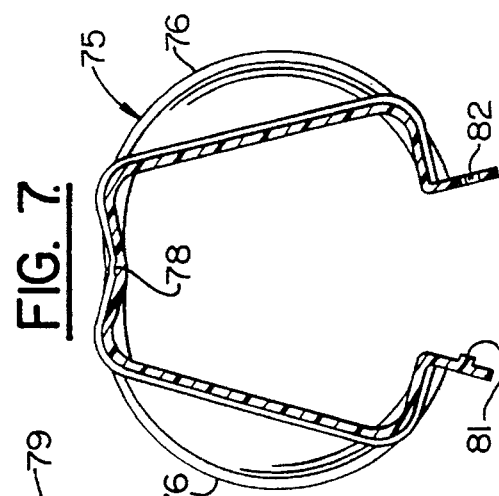
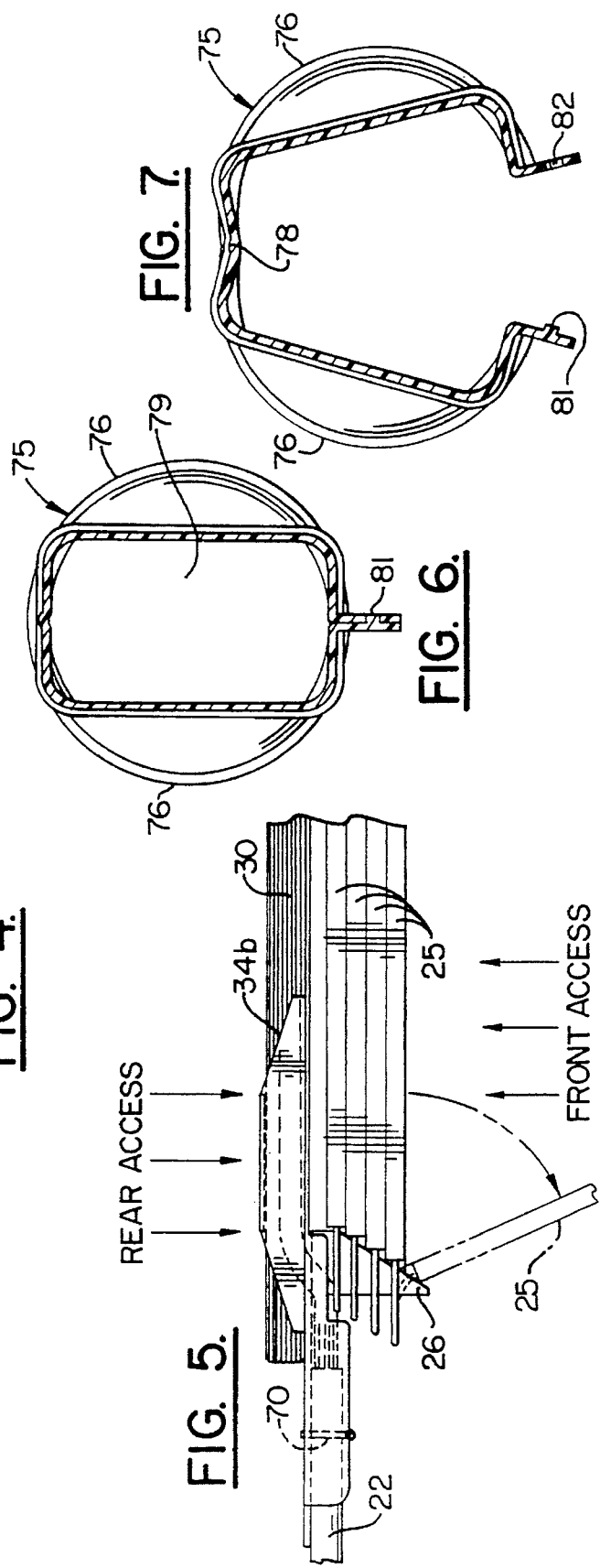

FIBER OPTIC SPLICE CLOSURE

FIELD OF THE INVENTION

The invention relates to the field of fiber optic communications systems and equipment and, more particularly, to a splice closure for the storage and protection of fiber optic splices and associated slack.

BACKGROUND OF THE INVENTION

Optical fiber communications systems are used extensively in the telecommunications industry due to their large information carrying capacity, their virtually noise-free performance, and the long span distances achievable with optical fibers before regeneration and amplification of the signal are required. Practical limits on the lengths of optical fiber cables that can be manufactured and installed typically require that several splice points be included over the total cable route.

At each such splice location, all of the optical fibers are separated from the other protective cable components for splicing and are, thus, more susceptible to damage. In addition, the optical fibers at a splice point are handled by a technician who splices the fibers and stores the splices and associated slack in a protective splice closure. In almost all fiber optic communications systems, it is critical that high quality and high reliability splices be obtained. Fusion and mechanical splicing techniques and equipment have been developed that permit low loss, high quality, and durable splices to be obtained. However, it may sometimes be necessary to remake or repair splices to achieve the desired splice quality.

There are many different types of splice closures for protecting optical fiber splices wherein all of the fibers are spliced to corresponding fibers in an adjacent cable section. Typically, these splice closures include one or more splice organizing trays, on which the individual splices and the relatively short lengths of associated slack fibers are mounted. For example, the assignee of the present invention manufactures a conventional splice enclosure and splice organizer under the model designation FOSC 100. Siecor Corporation of Hickory, N.C. makes splice enclosures under the model designations SC2, and SC4-6. Another splice enclosure is shown in UK Patent Application No. 2,150, 313A assigned to Preformed Line Products of Cleveland, Ohio.

Another common fiber optic communication system application requiring fiber splicing includes a main cable serving several drop cables at spaced apart locations along the route of the main cable. Splices are required at these drop points; however, not all of the fibers in the main cable are severed and spliced. Rather, only a relatively small number of fibers are typically spliced to the drop cable. The remaining fibers, or express fibers, are desirably left undisturbed. Accordingly, a large amount of slack is typically associated with these express fibers. This slack may be in the form of a plurality of buffer tubes, each in turn containing a plurality of fibers.

Fiber optic splice closures have been developed for protecting the splices between a main cable and a drop cable. Such closures typically have an in-line arrangement of incoming and outgoing cables. In addition, such closures typically have a compartment for storing the relatively large amount of slack express fibers. For example, U.S. Pat. No. 4,805,979 to Bossard et al. entitled *Fiber Optic Cable Splice Closure* and assigned to 3M, discloses an in-line splice closure including two rigid half shells.

Unfortunately, the 3M splice closure is assembled by routing the slack buffer tubes in a compartment defined by the lower rigid shell, and the splice organizer trays and cable end attachments are built upon the bottom shell. Thus, initial assembly is somewhat complicated and, moreover, the slack is extremely difficult to reaccess once the closure is assembled as the bottom shell cannot be removed without substantially disassembling the entire splice closure.

U.S. Pat. No. 4,679,896 to Krafcik et al. entitled *Optical Fiber Splice Organizer* discloses a splice closure including a bottom slack storage tray positioned within a cylindrical housing. The slack stored in the tray may only be accessed after removing a series of stacked splice organizers from a pair of upwardly extending threaded studs. Stated in other words, the access opening for the slack storage tray is covered by the stacked splice organizers and access to the slack requires disturbing the splice trays.

Somewhat similar to the Krafcik et al. splice closure is the closure described in U.S. Pat. No. 4,428,645 to Korbelak et al. entitled *Cable Accumulator*. The splice closure includes a hinged and removable splice organizer and underlying compartment or tray for slack cable. The splice organizer must be pivoted out of the way to gain access to the slack storage compartment opening.

Similar to such conventional splice closures, is splice closure model FOSC 100®D manufactured by Raychem, assignee of the present invention. The FOSC 100®D includes as an option, a slack storage compartment that may be mounted underlying a series of pivotally secured splice organizing trays. The access opening for the slack storage compartment is covered by the splice organizing trays; however, the splice trays may be pivoted upward to gain access to the slack. Thus, the splice trays must still be repositioned to access the underlying slack.

There are other applications where conventional splice closures have significant shortcomings. For example, when a new drop point must be added to an existing or preinstalled main cable, a so-called "taut sheath" splice is desirable. Unfortunately, conventional splice closure, such as the 3M closure, may be too short to permit sufficient slack fibers to be exposed from the cable. Similarly, for a taut sheath ring splice, wherein both incoming and outgoing fibers are spliced to a drop cable, a conventional closure does not permit obtaining sufficient slack for splicing.

Another shortcoming of conventional splice closures is that the use of such closures is expensive for a typical repair of a severed cable, since two splice closures must be used. In other words, in a conventional repair, a patch length of slack cable is spliced to restore the damaged cable section and two splice closures are used to protect each of the splices to the patch cable ends.

OBJECTS AND SUMMARY OF THE INVENTION

In view of the foregoing background, it is therefore an object of the present invention to provide a splice closure for securing optical fiber splices and slack, while facilitating initial access and reaccess to either the slack or the splices without disturbing the other.

It is another object of the present invention to provide a splice closure and associated method for facilitating splicing of a drop cable, for example, to a fiber optic cable that has already been installed, such as in a taut sheath fiber splice.

It a further object of the present invention to provide a splice closure and associated method for repairing a damaged fiber optic cable.

These and other objects, features, and advantages of the present invention are provided by a splice closure including an elongate frame and partition wall means for defining opposing front and rear, or first and second, opposing access areas for splice organizer means and slack storage means. In other words, the splice closure according to the invention permits access to the splices and slack relative independent from one another, thereby facilitating initial assembly and reaccess within the splice closure.

The wall partition means defines surface portions extending longitudinally between opposing ends of the frame. Thus, the splice organizing means is on the front or first surface portion so that the splices are accessible from a first access area, while the slack storage means is on the second surface portion of the partition wall means and stores slack optical fibers so that the slack is accessible from the second access area. The slack storage means preferably includes one or more pairs of opposing spaced apart sidewalls depending from the wall partition means and defining a slack storage access opening for facilitating access to the slack optical fibers from the second access area.

In one embodiment of the splice closure, the splice organizing means preferably includes a plurality of splice trays, and mounting means for mounting the splice trays in a stack. More particularly, the mounting means preferably includes means for pivotally mounting an end of each splice tray for pivotal movement between a stored position, generally parallel with the wall partition means, and a raised position, facilitating access to an underlying splice tray.

Another embodiment of the splice closure according to the present invention includes a second plurality of splice trays, and second mounting means for mounting the splice trays in a second stack longitudinally adjacent the first stack on the wall partition means. The second mounting means also preferably includes second means for pivotally mounting an end of each splice tray for pivotal movement between the stored and raised positions. In other words, this tandem splice tray embodiment preferably includes an elongate frame, and splice organizing means on the frame, and wherein the splice organizing means preferably includes a plurality of splice trays and first and second mounting means for mounting at least one of the splice trays in each of respective first and second longitudinally adjacent positions on the elongate frame.

The tandem splice tray embodiment may be useful for a number of applications, such as for facilitating the repair of a severed cable. In addition, the embodiment may have application in a taut sheath splice, and especially in a taut sheath ring splice, as more fully described below with respect to method aspects of the present invention.

Another feature of the splice closure according to the present invention is that the wall partition means includes at least one guide opening therethrough for routing optical fibers between the first and second access areas. Moreover, the guide opening preferably opens outwardly to an edge of the wall partition means to facilitate positioning of optical fibers through the guide opening without requiring severing of the optical fibers.

In one embodiment of the invention, the wall partition means includes a pair of opposing spaced apart generally rectangular walls lying in a common plane and extending in a longitudinal direction. The space between the two walls defines a longitudinally extending guide opening for routing optical fibers between the first and second access areas.

In another embodiment, the wall partition means is provided by a generally rectangular wall having at least one T-shaped opening therein. The T-shaped opening may be relatively large and located in a longitudinally central portion of the rectangular wall, or a pair of relatively small T-shaped openings may be provided adjacent opposing end portions of the rectangular wall.

Another aspect of the present invention is that a longitudinal extension member may be connected to an end of the wall partition means to provide an extended length for the closure. The extended length may be desirable in certain applications, such as a taut sheath cable splice, for example, as described more fully below according to a method aspect of the invention. In one embodiment, the extensible member may be provided by a rectangular wall or plate connected in end-to-end relation to the elongate frame.

The splice closure according to the invention also preferably includes a housing surrounding the frame, the splice organizer means, and the slack storage means. In one embodiment, such as for strict environmental sealing, the housing may be a tubular metal shell with a heat recoverable material surrounding the tubular shell. The tubular shell may be provided by two longitudinally extending sections, each having a semicircular cross-sectional shape. The tubular shell may also have tapered end portions defining a frustoconical shape for sealing the ends of the housing where the relatively smaller diameter cables enter. To further enhance sealing of the housing ends, a pair of elongate bodies are preferably positioned extending longitudinally outward from respective ends of the frame to engage respective ends of the heat recoverable material housing.

Another aspect of the invention provides a tubular shell including first and second longitudinally extending sections. Accordingly, an end portion of the first section is slidably positioned within an end portion of the second section. Thus, the length of the housing may be readily adjusted in the field by the technician to accommodate the frame length and an extension member, as desired. In addition, the heat recoverable material is available relatively long lengths and may be readily cut to length.

In another embodiment of the invention, such as for aerial applications where strict environmental sealing is not required, the housing preferably includes first and second longitudinally extending plastic panels. The panels are preferably joined together by an integrally molded lengthwise extending hinge.

The splice closure according to the present invention is preferably used in an in-line configuration. Accordingly, the splice closure preferably includes cable securing means carried by opposing end portions of the frame for securing respective fiber optic cables to the frame in the in-line configuration.

One method aspect of the present invention is for making a taut sheath fiber optic cable splice to one or more optical fibers in a cable of the type having an outer jacket and plurality of buffer tubes containing optical fibers. More particularly, the buffer tubes are arranged around a central supporting member in an oscillating helical lay pattern having a predetermined period.

The method includes providing a splice closure including an elongate frame and splice organizing means mounted thereon for holding one or more optical fiber splices, the frame having a predetermined length as least as great as the period of the oscillating helical lay pattern of the cable. The jacket is removed from the predetermined longitudinal portion of the cable corresponding to the period of the oscillating helical lay pattern of an underlying predetermined buffer tube to thereby produce slack in the buffer tube. The cable is secured to the frame and the one or more fibers of the predetermined buffer tube are spliced to respective fibers of another fiber optic cable. The splices are secured within the splice organizer means and the housing is placed surrounding the splice organizer means and the frame.

For a typical taut sheath splice, the splice closure including the extension member may be used to provide the additional length required to obtain sufficient slack. For a taut sheath ring splice, the tandem splice tray splice closure may be advantageously used.

Another method aspect according to the invention is directed to repairing a severed portion of a fiber optic cable. The method includes the steps of providing a splice closure including an elongate frame, and splice organizing means on the frame for securing splices between predetermined optical fibers. The splice organizing means includes a plurality of splice trays and first and second mounting means for mounting at least one of the splice trays in each of respective first and second longitudinally adjacent positions on the elongate frame. In other words, the tandem splice tray splice closure is provided. Other steps include: securing respective first and second ends of the fiber optic cable to respective opposing ends of the elongate frame of the splice closure, making first and second splices between a patch optical fiber and respective first and second ends of each severed optical fiber, and positioning the first and second splices in splice trays at respective first and second longitudinally adjacent positions on the elongate frame. Accordingly, the tandem longitudinal arrangement of the splice trays permits obtaining slack for repairing each severed optical fiber with an intervening patch optical fiber. The splice closure also preferably includes a housing surrounding the frame and the two stacks of splice trays.

BRIEF DESCRIPTION OF THE DRAWINGS

FIG. 4 is a fragmentary front view of another embodiment of the splice closure according to the present invention.

FIG. 5 is a greatly enlarged plan view of a portion of the embodiment of the splice closure shown in FIG. 4 with the housing removed for clarity.

FIG. 6 is a cross-sectional view of the housing of the splice closure taken along lines 6—6 as shown in FIG. 4.

FIG. 7 is a cross-sectional view of the housing of the splice closure as in FIG. 6 shown in an open position to facilitate assembly.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, applicants provide these embodiments so that this disclosure will be thorough and complete, and will fully convey the scope of the invention to those skilled in the art. Like numbers are used in alternate embodiments to designate similar elements.

Figure 1:
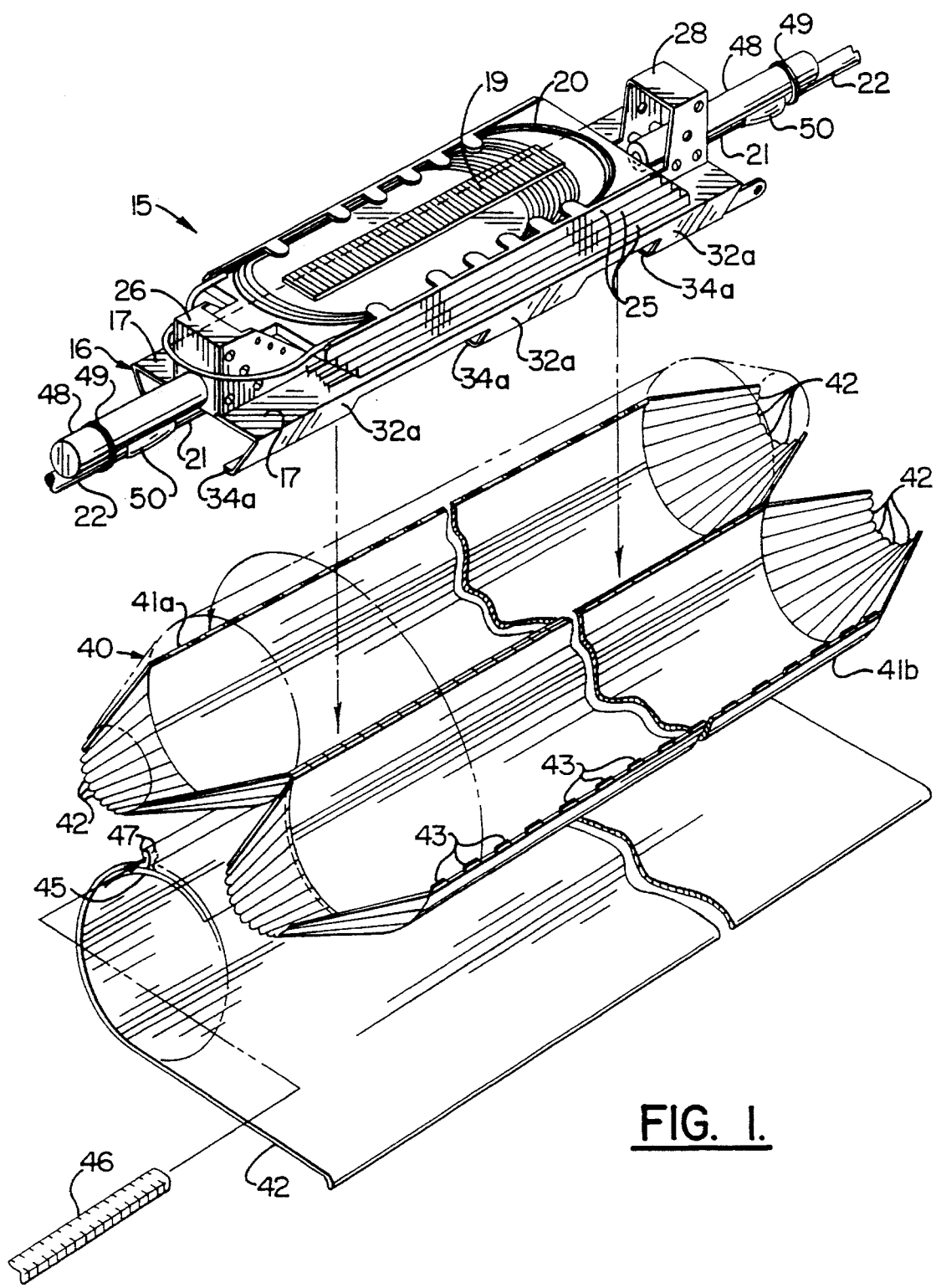
FIG. 1 is an exploded perspective view of an embodiment of the splice closure according to the invention.
Figure 2:
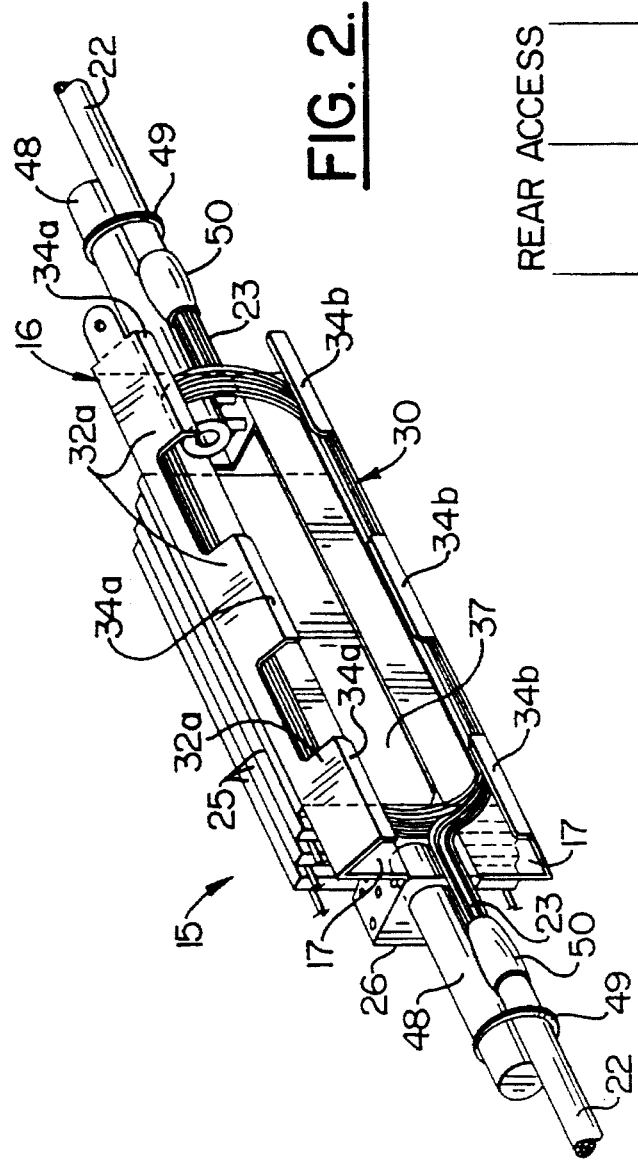
FIG. 2 is a rear perspective view of the embodiment of the splice closure as shown in FIG. 1 with the housing removed for clarity.
Figure 3:
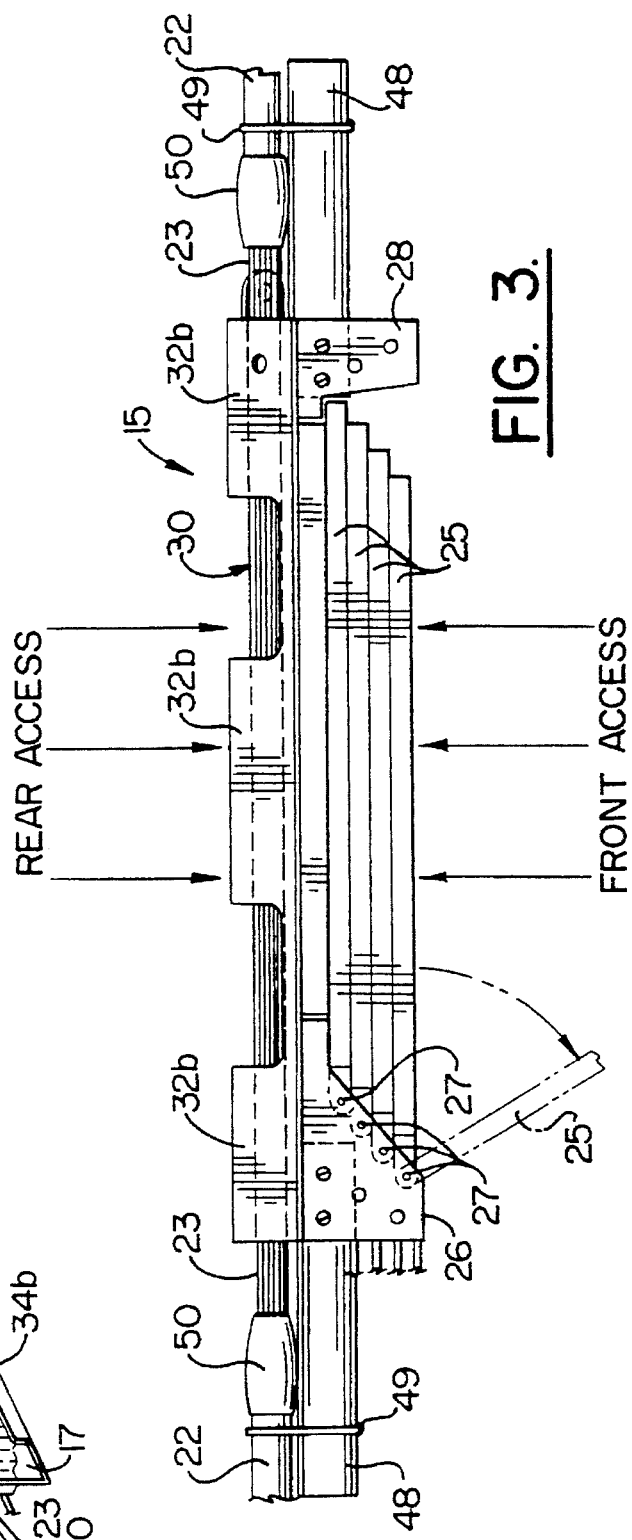
FIG. 3 is an enlarged plan view of the embodiment of the splice closure as shown in FIG. 1 with the housing removed for clarity.

Referring first to FIGS. 1–3, a first embodiment of the splice closure 15 according to the invention is explained. The splice closure 15 is for securing splices 19 between individual optical fibers 20 extending from one or more fiber optic buffer tubes 23 of one or more fiber optic cables 22.

The splice closure 15 includes an elongate frame 16 having opposing ends. More particularly, in the illustrated embodiment, the frame 16 includes wall partition means provided by a pair of spaced apart generally rectangular walls 17 lying in a common plane and extending in a longitudinal direction. The wall partition means provided by the spaced apart walls 17 defines opposing first and second surface portions extending longitudinally between opposing ends of the frame 16. These opposing first and second surface portions, in turn, define respective opposing first and second, or front and rear, access areas as highlighted in FIG. 3.

Splice organizing means is positioned on the first or front surface portion of the pair of walls 17 for securing splices 19 between predetermined optical fibers 20 so that the splices are accessible from the first access area. As shown in the illustrated embodiment, the splice organizing means includes a plurality of splice trays 25, and mounting means for mounting the splice trays in a stack. The mounting means preferably includes means for pivotally mounting an end of each splice tray 25 for pivotal movement between a stored position, generally parallel with the pair of walls 17, and a raised position, facilitating access to an underlying splice tray as also shown best in FIG. 3.

As shown in the illustrated embodiment, the pivotal mounting means includes a bracket 26 having a series of openings therein receiving hinge pins 27 for pivotally mounting the splice trays 25 to the frame 16. Other pivotal mounting arrangements will be readily appreciated by those skilled in the art.

The bracket 26 is integrally formed with the pair of walls 17 forming the wall partition means. Accordingly, the frame 16 includes a second integrally formed bracket 28 at an opposite end of the frame so that the frame may be formed from a single sheet of metal.

Slack storage means is provided on the second or rear surface portion of the pair of walls 17 for storing slack 30 contained within buffer tubes as shown in the illustrated embodiment. Accordingly, the slack 30 is accessible from the second access area, and may be initially accessed and reaccessed without unnecessarily disturbing the splice trays 25. As would be readily understood by those skilled in the art, the slack 30 may be in the form of buffer tubes, individual fibers, or transport tubes, for example.

The slack storage means preferably includes one or more pairs of opposing spaced apart sidewalls 32a, 32b depending from the pair of walls 17 which provide the wall partition means. In the illustrated embodiment, the sidewalls include respective inwardly facing tabs 34a, 34b to further secure the slack 30 in place. In addition, the sidewalls 32a, 32b have an arcuate shape corresponding to the circular cross-section shape of the housing 40 described in greater detail below. The free ends of the sidewalls 32a, 32b and their respective tabs 34a, 34b thus define a slack storage access opening for facilitating access to the slack optical fibers from the second or rear access area (FIGS. 2 and 3).

Referring now more particularly to FIG. 2, the pair of walls 17 which provide the wall partition means also define a longitudinally extending guide opening 37 for routing optical fibers between the first and second access areas. The guide opening 37 also opens outwardly to an end edge of the wall partition means to facilitate positioning of optical fibers through the guide opening without requiring severing of the optical fibers.

Referring now more particularly to FIG. 1, the splice closure also preferably includes a housing 40 surrounding the frame 16, the splice organizer means, and the slack storage means. As shown in the illustrated embodiment, the housing 40 includes a tubular shell having first and second halves 41a, 41b and a heat recoverable material sheet 42 surrounding the tubular shell. As would be readily understood by those skilled in the art, the housing 40 is preferably of the conventional type used in splicing of copper cables commonly used in the telephone industry.

The shell halves 41a, 41b each preferably have a semi-circular cross-sectional shape, and a plurality of tapered end portions for defining a frustoconical shape for the housing ends when the heat recoverable material sheet 42 is heated and draws down upon the shell. In addition, each shell half 41a, 41b also preferably includes a series of longitudinally spaced apart tabs 43 offset on opposing shell edges to thereby form a hingelike joint.

The heat recoverable material sheet 42 preferably includes an adhesive flap portion 45 for sealing the longitudinal seam between the opposing beaded edges 47 of the sheet. In addition, a clip 46 is preferably used to secure the opposing beaded edges 47 of the heat recoverable material sheet 42.

To further assist in sealing the end portions of the housing 40, the splice closure preferably also includes a pair of elongate tubular bodies 48 extending longitudinally outward from respective ends of the frame 16. The tubular bodies are secured to respective brackets 26, 28 at each end of the frame 16. The elongate tubular bodies 48 increase the minimum diameter to which the heat recoverable material of the housing 40 must shrink to seal the ends of the housing to the entering cables 22.

The elongate tubular bodies 48 also cooperate with respective fasteners, such as tie wraps 49, to provide means for securing the fiber optic cables 22 to the frame 16 in an in-line configuration. To further reduce the likelihood of water migration into the interior of the splice closure 15, the ends of the cables 22 may be sealed by a water blocking compound and heat shrink tubular cover 50 as would be readily understood by those skilled in the art.

Referring now to FIGS. 4–7 a second embodiment of the splice closure 60 according to the invention is explained. This embodiment of the splice closure 60 is particularly well suited for an aerial installation as shown, wherein the splice closure is supported from an overhead messenger strand 61. To facilitate understanding of this embodiment, like numbers are used where possible for like elements discussed above with respect to the embodiment of the splice closure as shown in FIGS. 1–3.

The splice closure 60 includes an elongate frame 62 on which splice organizing means pivotally secures a plurality of splice trays 25. The splice trays 25 hold splices 19 between predetermined optical fibers 20 from predetermined fiber optic cables 22. The splice closure 60 also includes wall partition means provided by a generally rectangular wall 63. The splice organizer means is on a first or front surface portion of the generally rectangular wall 63.

Slack storage means is on the second or back surface of the generally rectangular wall 63 so that the slack 30 is accessible from the second or rear access area (FIG. 5). The slack storage means is provided by one or more pairs of opposing sidewalls, only one sidewall 34b being shown in the illustrated embodiment for clarity. The sidewalls define a slack access opening for the splice closure 60.

A relatively large T-shaped guide opening 67 (FIG. 4) is provided in a central or medial portion of the generally rectangular wall 62 so that slack 30 may be readily positioned within the slack storage means and routed between the first and second access areas of the splice closure 60. The T-shaped guide opening 67 preferably opens outwardly to a bottom edge of the generally rectangular wall 63 as shown in the illustrated embodiment. Accordingly, the express buffer tubes 23 not being accessed may be readily positioned into the slack storage means without requiring cutting of the buffer tubes.

The frame 62 of the splice closure 60 is suspended from the messenger 61 by a pair of metal L-shaped members 65. An insulator, not shown, may be positioned between each of the L-shaped members 65 and the frame 62 to electrically isolate the frame. In addition, proper alignment of the fiber optic cables 22 entering the splice closure 60 is maintained by stacked spacers blocks 66 as would be readily understood by those skilled in the art.

As shown in the illustrated embodiment, the splice closure 60 is suited for splicing cables 22 in an in-line configuration. Accordingly, the splice closure 60 includes means for securing the cables 22 in an in-line configuration. More particularly, the generally rectangular wall 63 includes openings 68 adjacent each end defining stubs 69 for securing ends of the cable 22 thereto with a fastener, such as a band clamp 70.

The housing 75 for the splice closure 60 as illustrated includes first and second longitudinally extending corrugated plastic panels 76, and an integrally molded longitudinally extending hinge portion 78 interconnecting the plastic panels. The housing 75 includes generally rectangular end openings 79 which are secured around corresponding rectangularly shaped end caps 80 through which the cables 22 enter the splice closure. As shown in FIGS. 6 and 7, the plastic panels 76 are joined together at their bottom edges by respective projections 81 and corresponding openings 82.

Figure 8:
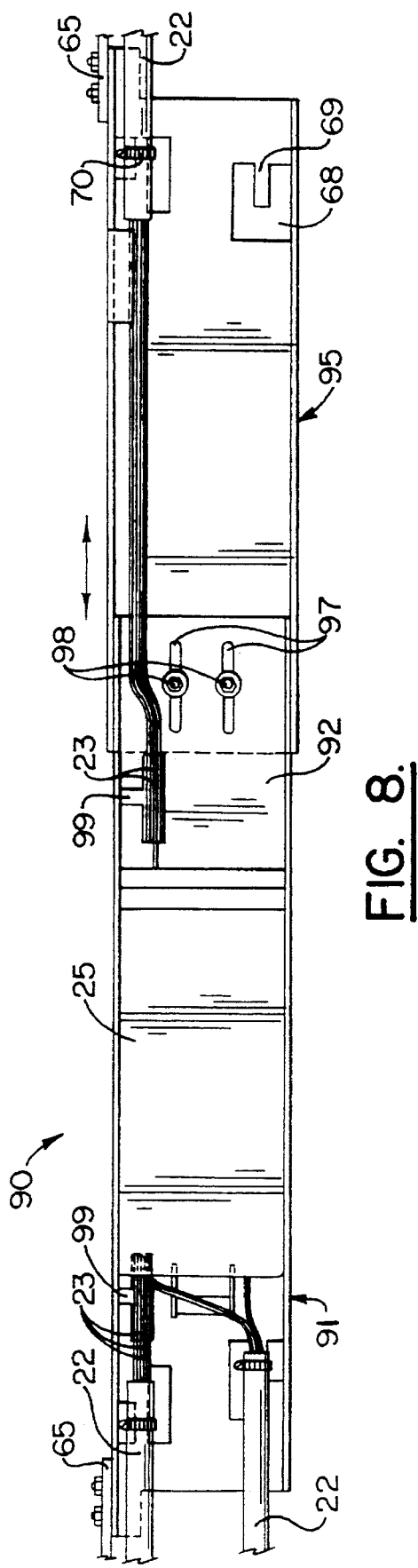
FIG. 8 is a front view of yet another embodiment of the splice closure according to the invention with the housing removed and without the optical fibers or splices being shown for clarity.

Referring now to FIG. 8, another aspect of the present invention is explained. In certain applications, access to a relatively long length of optical fibers 20 contained within the fiber optic cable 22 may be required. For example, it may be desirable to add a drop cable to a main cable that is already installed, that is, to make a taut sheath splice. Accordingly, the embodiment of the splice closure 90 as illustrated may thus be used to mount and protect the splices and the exposed relatively long portion of the cable. To accommodate such a requirement, a longitudinal extension member 95 may be connected to an end of the frame 91. In the illustrated embodiment, the frame 91 includes a generally rectangular wall 92.

The extension member 95 and the generally rectangular wall 92 may have overlapping ends as illustrated and fastening means for securing the ends together with an adjustable degree of overlap to provide a predetermined length for the splice closure 90. As shown in the illustrated embodiment, the fastening means includes a pair of slotted openings 97 in each extension member 95 and the generally rectangular wall 92, and a pair of bolts 98 extending through the respective openings. As would be readily understood by those skilled in the art, other shapes of longitudinal extension member may also be provided, and other attachment arrangements for the extension member are contemplated by the invention.

FIG. 8 also illustrates another feature of the invention, that is, a pair of relatively small T-shaped openings 99 provided in the generally rectangular wall 92 for facilitating routing of fibers between the front and rear access areas of the splice closure 90. As illustrated, the T-shaped openings 99 open outwardly to an upper edge of the generally rectangular wall 92.

Figure 9:
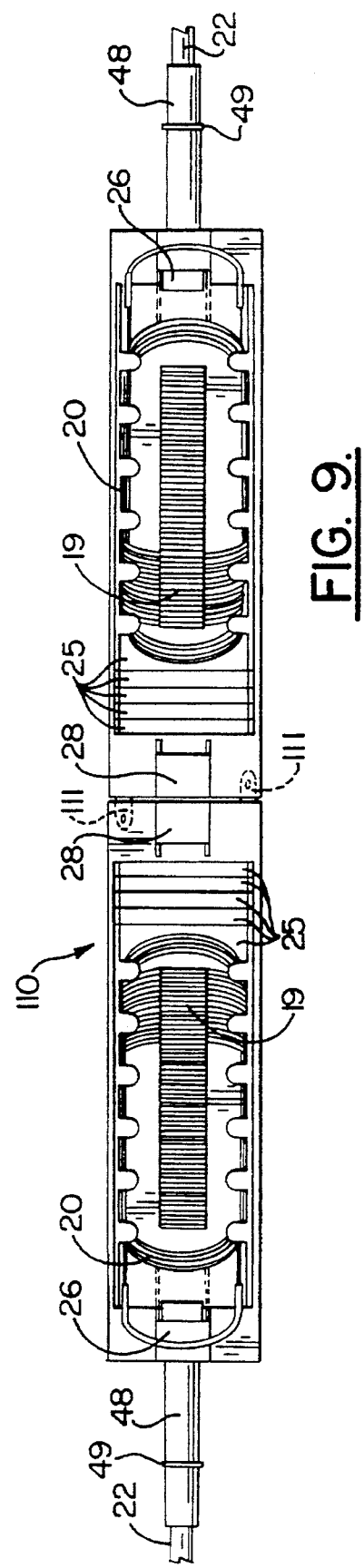
FIG. 9 is front view of another embodiment of the splice closure according to the invention illustrating a tandem arrangement of splice trays, and with the housing removed for clarity.

Referring now to FIG. 9, another embodiment of a splice closure 110 according to the invention is illustrated. This embodiment of the splice closure 110 includes a marriage of the components of two splice closures 15 as illustrated in FIGS. 1–3. Thus, where possible, like reference numbers are used in FIG. 9 and the following description for ease of understanding.

More particularly, as shown in the central portion of FIG. 9, the respective frames 16 of two splice closures are joined in end-to-end relation by positioning fasteners, not shown, through each protruding tab 111 and corresponding opening, not shown, in the flames. As would be readily understood by those skilled in the art, other securing arrangements may also be used.

The illustrated embodiment of the splice closure 110 includes first and second mounting means for mounting the plurality of splice trays 25 in respective first and second longitudinally adjacent stacks on the joined together frames 16. As discussed above with respect to FIGS. 1–3, each of the first and second mounting means preferably include means for pivotally mounting an end of each splice tray 25 for pivotal movement between a stored position, generally parallel with the frame, and a raised position, facilitating access to an underlying splice tray.

The entry of optical fibers 20 into each splice tray 25 in respective stacks is immediately adjacent respective ends of the splice closure 110. Accordingly, more efficient usage of the slack is achieved. The other attendant features and benefits including splice access from the front access and area, and slack access from the rear access area are also present in the embodiment illustrated in FIG. 9.

The splice closure 110 with the tandem sets of splice trays 25 may have a wide number of applications. In particular, the splice closure 110 may be readily used to repair a severed cable while requiring the use of only one splice closure 110 rather than two as in the prior art. This method aspect of the invention is discussed further below. Another application for the splice closure is a taut sheath ring splice. Yet another application for the splice closure 110 may include achieving a higher capacity for splices within the closure. These and yet other applications for the splice closure 110 will be readily appreciated by those skilled in the art.

Another aspect of the embodiments of the splice closures 90 and 110 as shown in FIGS. 8 and 9, respectively, is that each relatively long assembly may be readily surrounded by a single housing of sufficient length. A housing 75 of the type as shown in FIGS. 4, 6 and 7 may be used, such as for an aerial application where strict environmental sealing is not required. Alternatively, a heat recoverable housing 40 of the type shown in FIG. 1 may be used for the embodiments illustrated in FIGS. 8 and 9. In addition, another variation of an extensible heat recoverable housing 120 is shown in FIG. 10.

Figure 10:
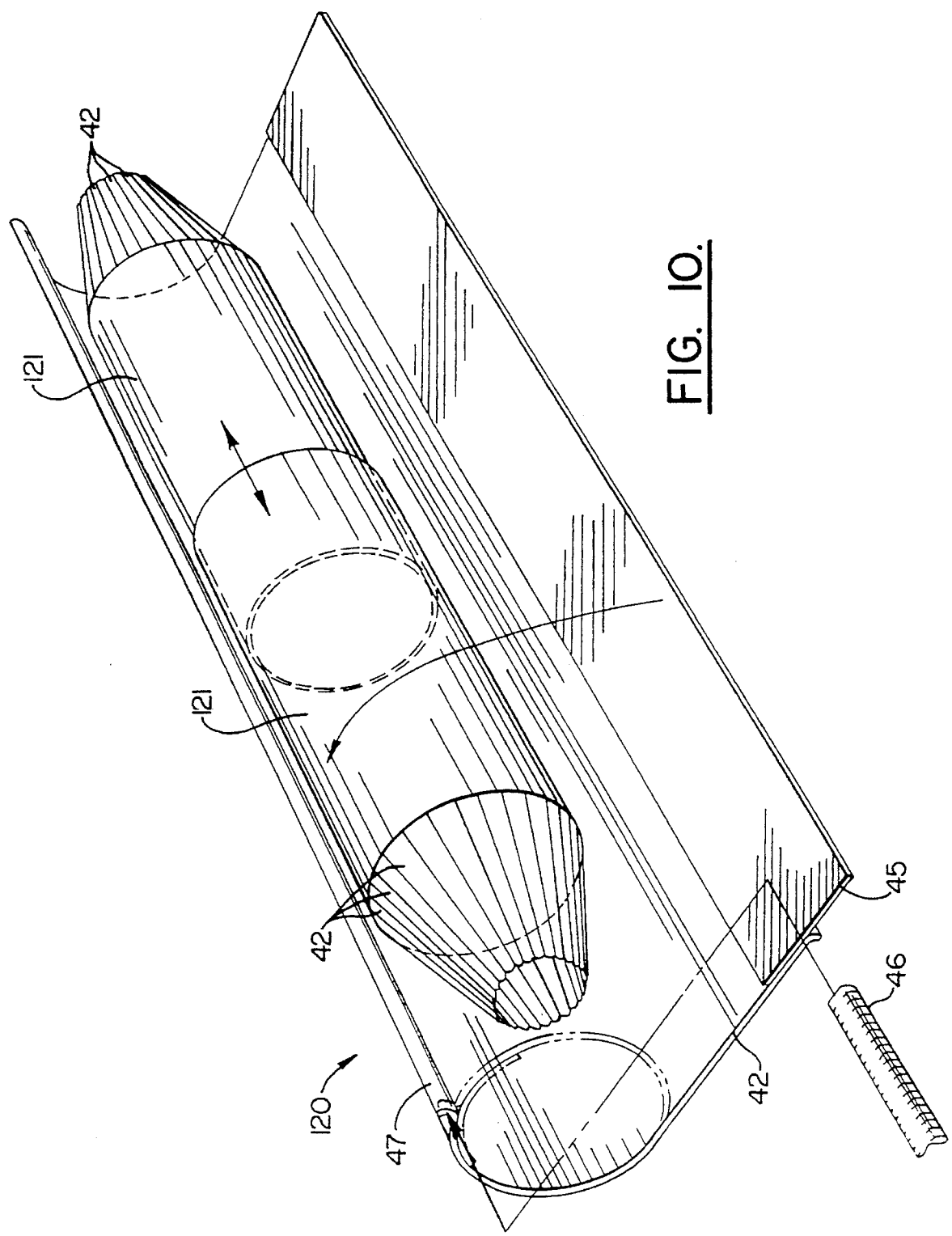
FIG. 10 is a perspective view of another embodiment of a housing according to the invention.

As shown in FIG. 10, the housing 120 includes first and second longitudinally extending sections 121, wherein an end portion of the first section is slidably positioned with an end portion of the second section. Thus, the length of the housing 120 may be selected by adjusting the amount of overlap of the ends of the longitudinally extending sections 121, and cutting the heat recoverable material sheet 42 and the securing clip 46 to a corresponding length. Although not shown for clarity, each of the shell sections 121 may, in turn, include a pair of longitudinal sections as shown in FIG. 1.

One method aspect of the present invention is for making a taut sheath splice to one or more optical fibers in a cable of the type having an outer jacket and plurality of buffer tubes containing optical fibers. More particularly, as would be readily understood by those skilled in the art, the buffer tubes are arranged around a central supporting member in an oscillating helical lay pattern having a predetermined period. In other words, the helical lay pattern reverses at regular intervals along the cable.

The method includes providing a splice closure including an elongate frame and splice organizing means mounted thereon for holding one or more optical fiber splices, the frame having a predetermined length as least as great as the period of the oscillating helical lay pattern of the cable. The jacket is removed from a predetermined longitudinal portion of the cable corresponding to the period of the oscillating helical lay pattern of an underlying predetermined buffer tube to thereby produce slack in the predetermined buffer tube. The predetermined longitudinal portion of the cable is secured to the frame. Splicing of one or more of the fibers of the predetermined buffer tube to respective one or more fibers of another fiber optic cable is performed, and the splices are secured within the splice organizer means.

The taut sheath splice is also preferably protected by securing a housing of the splice closure around the frame and the splice organizer means. In addition, the step of providing the elongate frame of predetermined length preferably includes the step of adding an extension member to a first longitudinally extending portion of the frame on which the splice organizer means is mounted as described above. Alternatively, the step of providing the splice closure may include providing the tandem splice tray embodiment of the splice closure as also described above.

Another method aspect according to the invention is directed to repairing a severed portion of a fiber optic cable. The method includes the steps of providing a splice closure including an elongate frame, and splice organizing means on the frame for securing splices between predetermined optical fibers, the splice organizing means including a plurality of splice trays and first and second mounting means for mounting at least one of the splice trays in each of respective first and second longitudinally adjacent positions on the elongate frame. In other words, the tandem splice tray splice closure is provided.

The other steps of the repair method include securing respective first and second ends of the fiber optic cable to respective opposing ends of the elongate frame of the splice closure, making first and second splices between a patch optical fiber and respective first and second ends of each severed optical fiber, and positioning the first and second splices in splice trays at respective first and second longitudinally adjacent positions on the elongate frame. Accordingly, the tandem longitudinal arrangement of the splice trays permits obtaining slack for repairing each severed optical fiber with an intervening patch optical fiber.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A fiber optic splice closure for one or more fiber optic cables of the type having one or more optical fibers, said splice closure comprising:

an elongate frame having opposing ends, said frame including partition wall means for defining opposing first and second surface portions extending longitudinally between opposing ends of said frame, said opposing first and second surface portions defining respective opposing first and second access areas;

splice organizing means on the first surface portion of said partition wall means for securing splices between predetermined optical fibers so that the splices are accessible and reaccessible from the first access area without disturbing the second access area; and slack storage means on the second surface portion of said partition wall means for storing slack optical fibers so that the slack optical fibers are accessible and reaccessible from the second access area without disturbing the first access area.

2. A splice closure according to claim 1 wherein said slack storage means comprises a pair of opposing spaced apart sidewalls depending from said wall partition means and defining a slack storage access opening for facilitating access to the slack optical fibers from the second access area.

3. A splice closure according to claim 1 wherein said splice organizing means comprises a plurality of splice trays, and mounting means for mounting said splice trays in a stack, and wherein said mounting means includes means for pivotally mounting an end of each splice tray for pivotal movement between a stored position generally parallel with said wall partition means and a raised position facilitating access to an underlying splice tray.

4. A splice closure according to claim 3 further comprising a second plurality of splice trays, and second mounting means for mounting said splice trays in a second stack longitudinally adjacent the first stack on said wall partition means, and wherein said second mounting means includes second means for pivotally mounting an end of each splice tray for pivotal movement between a stored position generally parallel with said wall partition means and a raised position facilitating access to an underlying splice tray.

5. A splice closure according to claim 1 wherein said wall partition means includes at least one guide opening therethrough for routing optical fibers between said first and second access areas.

6. A splice closure according to claim 5 wherein said at least one guide opening is open outwardly to an edge of said wall partition means to facilitate positioning of optical fibers through said at least one guide opening without requiring severing of the optical fibers.

7. A splice closure according to claim 1 wherein said wall partition means comprises a pair of opposing spaced apart generally rectangular walls lying in a common plane and extending in a longitudinal direction thereby defining a longitudinally extending guide opening for routing optical fibers between said first and second access areas.

8. A splice closure according to claim 1 wherein said wall partition means comprises a generally rectangular wall having at least one T-shaped opening therein and defining at least one guide opening for routing optical fibers between said first and second access areas.

9. A splice closure according to claim 1 further comprising a longitudinal extension member connected to an end of said wall partition means.

10. A splice closure according to claim 1 further comprising a housing surrounding said frame, said splice organizer means, and said slack storage means.

11. A splice closure according to claim 10 wherein said housing comprises a tubular shell and a heat recoverable material surrounding said tubular shell.

12. A splice closure according to claim 11 wherein said tubular shell comprises first and second longitudinally extending sections, and wherein an end portion of the first section is slidably positioned within an end portion of the second section.

13. A splice closure according to claim 11 further comprising a pair of elongate bodies extending longitudinally outward from respective ends of said frame and engaging respective ends of said heat recoverable housing to enhance sealing of same.

14. A splice closure according to claim 10 wherein said housing comprises first and second longitudinally extending plastic panels, and an integrally molded lengthwise extending hinge portion interconnecting said first and second plastic panels.

15. A splice closure according to claim 1 further comprising cable securing means carried by opposing end portions of said frame for securing respective fiber optic cables to said frame in an in-line configuration.

16. A fiber optic splice closure for one or more fiber optic cables of the type having one or more optical fibers, said splice closure comprising:

an elongate frame having opposing ends, said frame including partition wall means for defining opposing first and second surface portions extending longitudinally between opposing ends of said frame, said opposing first and second surface portions defining respective opposing first and second access areas;

splice organizing means on the first surface portion of said partition wall means for securing splices between predetermined optical fibers so that the splices are accessible and reaccessible from the first access area, said splice organizing means comprising a plurality of splice trays and mounting means for mounting said splice trays in a stack, said mounting means including means for pivotally mounting an end of each splice tray for pivotal movement between a stored position generally parallel with said wall partition means and a raised position facilitating access to an underlying splice tray; and slack storage means on the second surface portion of said partition wall means for storing slack optical fibers so that the slack optical fibers are accessible and reaccessible from the second access area, said slack storage means comprising a pair of opposing spaced apart sidewalls depending from said wall partition means and defining a slack storage access opening for facilitating access to the slack optical fibers from the second access area.

17. A splice closure according to claim 16 wherein said splice organizing means further comprises a second plurality of splice trays, and second mounting means for mounting said splice trays in a second stack longitudinally adjacent the first stack on said wall partition means, and wherein said second mounting means includes second means for pivotally mounting an end of each splice tray for pivotal movement between a stored position generally parallel with said wall partition means and a raised position facilitating access to an underlying splice tray.

18. A splice closure according to claim 16 wherein said wall partition means includes at least one guide opening therethrough for routing optical fibers between said first and second access areas.

19. A splice closure according to claim 18 wherein said at least one guide opening is open outwardly to an edge of said wall partition means to facilitate positioning of optical fibers through said at least one guide opening without requiring severing of the optical fibers.

20. A splice closure according to claim 16 wherein said wall partition means comprises a pair of opposing spaced apart generally rectangular walls extending in a common plane and in a longitudinal direction thereby defining a longitudinally extending guide opening for routing optical fibers between said first and second access areas.

21. A splice closure according to claim 16 wherein said wall partition means comprises a generally rectangular wall having at least one T-shaped opening therein and defining at least one guide opening for routing optical fibers between said first and second access areas.

22. A splice closure according to claim 16 further comprising a longitudinal extension member connected to an end of said wall partition means.

23. A splice closure according to claim 16 further comprising a housing surrounding said frame, said splice organizer means, and said slack storage means.

24. A splice closure according to claim 23 wherein said housing comprises a tubular shell and a heat recoverable material surrounding said tubular shell.

25. A splice closure according to claim 24 wherein said tubular shell comprises first and second longitudinally extending sections, and wherein an end portion of the first section is slidably positioned within an end portion of the second section.

26. A splice closure according to claim 24 further comprising a pair of elongate bodies extending longitudinally outward from respective ends of said frame and engaging respective ends of said heat recoverable housing to enhance sealing of same.

27. A splice closure according to claim 23 wherein said housing comprises first and second longitudinally extending plastic panels, and an integrally molded lengthwise extending hinge portion interconnecting said first and second plastic panels.

28. A splice closure according to claim 16 further comprising cable securing means carried by opposing end portions of said frame for securing respective fiber optic cables to said frame in an in-line configuration.

29. A fiber optic splice closure for one or more fiber optic cables of the type having one or more optical fibers, said splice closure comprising:

an elongate frame;

splice organizing means on said frame for securing splices between predetermined optical fibers, said splice organizing means comprising a plurality of splice trays and first and second mounting means for mounting said plurality of splice trays in respective first and second longitudinally adjacent stacks on said frame, each of said first and second mounting means including means for pivotally mounting an end of each splice tray for pivotal movement between a stored position generally parallel with said frame and a raised position facilitating access to an underlying splice tray;

said elongate frame including partition wall means for defining opposing first and second surface portions extending longitudinally between opposing ends of said frame, wherein said opposing first and second surface portions define respective opposing first and second reaccessible access areas, and wherein said splice organizing means is on the first surface portion of said wall partition means; and slack storage means on the second surface portion of said wall partition means for storing slack optical fibers.

30. A splice closure according to claim 29 wherein said slack storage means comprises a pair of opposing spaced apart sidewalls depending from said partition wall means and defining a slack storage access opening for facilitating access to the slack optical fibers from the second access area.

31. A splice closure according to claim 29 further comprising a housing surrounding said frame, and said splice organizer means.

32. A splice closure according to claim 31 wherein said housing comprises a tubular shell and a heat recoverable material surrounding said tubular shell.

33. A splice closure according to claim 32 wherein said tubular shell comprises first and second longitudinally extending sections, and wherein an end portion of the first section is slidably positioned within an end portion of the second section.

34. A splice closure according to claim 32 further comprising a pair of elongate bodies extending longitudinally outward from respective ends of said frame and engaging respective ends of said heat recoverable housing to enhance sealing of same.

35. A splice closure according to claim 31 wherein said housing comprises first and second longitudinally extending plastic panels, and an integrally molded lengthwise extending hinge portion interconnecting said first and second plastic panels.

36. A splice closure according to claim 29 further comprising cable securing means carried by opposing end portions of said frame for securing respective fiber optic cables to said frame in an in-line configuration.

37. A fiber optic splice closure for one or more fiber optic cables of the type having one or more optical fibers, said splice closure comprising:

an elongate frame;

splice organizing means on said frame for securing splices between predetermined optical fibers, said splice organizing means comprising a plurality of splice trays and first and second mounting means for mounting at least one of said splice trays in each of respective first and second longitudinally adjacent positions on said elongate frame;

said elongate frame including partition wall means for defining opposing first and second surface portions extending longitudinally between opposing ends of said frame, wherein said opposing first and second surface portions define respective opposing first and second reaccessible access areas, and wherein said splice organizing means is on the first surface portion of said wall partition means; and slack storage means on the second surface portion of said wall partition means for storing slack optical fibers.

38. A splice closure according to claim 37 wherein said slack storage means comprises a pair of opposing spaced apart sidewalls depending from said partition wall means and defining a slack storage access opening for facilitating access to the slack optical fibers from the second access area.

39. A splice closure according to claim 37 further comprising a housing surrounding said frame, and said splice organizer means.

40. A splice closure according to claim 39 wherein said housing comprises a tubular shell and a heat recoverable material surrounding said tubular shell.

41. A splice closure according to claim 40 wherein said tubular shell comprises first and second longitudinally extending sections, and wherein an end portion of the first section is slidably positioned within an end portion of the second section.

42. A splice closure according to claim 40 further comprising a pair of elongate bodies extending longitudinally outward from respective ends of said frame and engaging respective ends of said heat recoverable housing to enhance sealing of same.

43. A splice closure according to claim 39 wherein said housing comprises first and second longitudinally extending plastic panels, and an integrally molded lengthwise extending hinge portion interconnecting said first and second plastic panels.

44. A splice closure according to claim 37 further comprising cable securing means carried by opposing end portions of said frame for securing respective fiber optic cables to said frame in an in-line configuration.

45. A fiber optic splice closure for fiber optic cables of the type having one or more optical fibers, said splice closure comprising:

an elongate frame;

splice organizer means on said frame for securing optical fiber splices between respective fiber optic cables;

a longitudinal extension member connected to an end of said frame;

cable securing means carried by opposing end portions of said frame and said extension member for securing a fiber optic cable in an in-line configuration; and a housing extending longitudinally along said frame and said extension member, said housing surrounding said frame, said extension member and said splice organizer means.

46. A splice closure according to claim 45 wherein said housing comprises a tubular shell and a heat recoverable material surrounding said tubular shell.

47. A splice closure according to claim 46 wherein said tubular shell comprises first and second longitudinally extending sections, and wherein an end portion of the first section is slidably positioned within an end portion of the second section.

48. A splice closure according to claim 46 further comprising a pair of elongate bodies extending longitudinally outward from respective ends of said frame and said extension member and engaging respective ends of said heat recoverable housing to enhance sealing of same.

49. A splice closure according to claim 45 wherein said housing comprises first and second longitudinally extending plastic panels, and an integrally molded lengthwise extending hinge portion interconnecting said first and second plastic panels.

50. A splice closure according to claim 45 wherein said elongate frame includes partition wall means for defining opposing first and second surface portions extending longitudinally between opposing ends of said frame, wherein said opposing first and second surface portions define respective opposing first and second access areas, and wherein said splice organizing means is on the first surface portion of said wall partition means.

51. A splice closure according to claim 50 wherein said splice organizing means comprises a plurality of splice trays and mounting means for mounting said splice trays in a stack on the first surface portion of said partition wall means, and wherein said mounting means includes means for pivotally mounting an end of each splice tray for pivotal movement between a stored position generally parallel with said wall partition means and a raised position facilitating access to an underlying splice tray.

52. A splice closure according to claim 50 further comprising slack storage means on the second surface portion of said wall partition means for storing slack optical fibers, and wherein said slack storage means comprises a pair of opposing spaced apart sidewalls depending from said partition wall means and defining a slack storage access opening for facilitating access to the slack optical fibers from the second access area.

* * * * *

UNITED STATES PATENT AND TRADEMARK OFFICE
CERTIFICATE OF CORRECTION

PATENT NO. : 5,479,553
DATED : Dec. 26, 1995
INVENTOR(S) : Daems, et al.

It is certified that error appears in the above-indentified patent and that said Letters Patent is hereby corrected as shown below:

Column 9, Line 31 replace "flames" by --frames--

Signed and Sealed this

Fourteenth Day of July, 1998

Attest:

BRUCE LEHMAN

Attesting Officer

Commissioner of Patents and Trademarks